United States Patent
Foerster et al.

(10) Patent No.: US 10,650,317 B2
(45) Date of Patent: May 12, 2020

(54) DETECTING AND CORRECTING POTENTIAL ERRORS IN USER BEHAVIOR

(71) Applicant: Google LLC, Mountain View, CA (US)

(72) Inventors: Jakob Nicolaus Foerster, Zurich (CH); Frederick Peter Brewin, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 698 days.

(21) Appl. No.: 14/860,151

(22) Filed: Sep. 21, 2015

(65) Prior Publication Data

US 2017/0083821 A1 Mar. 23, 2017

(51) Int. Cl.
*G01C 21/36* (2006.01)
*G06N 7/00* (2006.01)
*G06N 5/02* (2006.01)

(52) U.S. Cl.
CPC ......... *G06N 7/005* (2013.01); *G01C 21/3617* (2013.01); *G06N 5/022* (2013.01)

(58) Field of Classification Search
CPC ............ G01C 21/3617; G01C 21/3484; G01C 21/3697; G01C 21/3641; G01C 21/20; G01C 21/3679; G01C 21/3415; H04W 4/021; G06Q 10/063114; G06Q 10/063116; G06Q 10/047; G06Q 10/109; G06Q 10/1097; G06Q 10/06; G06Q 10/08355; G08B 21/06; G06F 17/30; C01C 21/3617

See application file for complete search history.

(56) References Cited

U.S. PATENT DOCUMENTS

| 7,649,454 | B2 | 1/2010 | Singh et al. |
| 8,255,159 | B1* | 8/2012 | Bierbaum ........ G08G 1/096883 235/382 |
| 9,008,888 | B1* | 4/2015 | Gravino ............ G01C 21/3682 701/26 |
| 2008/0167937 | A1* | 7/2008 | Coughlin ............... G01C 21/20 705/7.16 |

(Continued)

FOREIGN PATENT DOCUMENTS

| RU | 2406158 C2 | 12/2010 |
| RU | 2556416 C2 | 7/2015 |
| WO | WO2015089865 A1 | 6/2015 |

OTHER PUBLICATIONS

International Search Report and Written Opinion of International Application No. PCT/US2016/039508, dated Sep. 5, 2016, 12 pp.

(Continued)

*Primary Examiner* — Vincent Gonzales
*Assistant Examiner* — Markus A. Vasquez
(74) *Attorney, Agent, or Firm* — Middleton Reutlinger

(57) ABSTRACT

A computing system is described that predicts a future action to be taken by a user of a computing device and determines, based on contextual information associated with the computing device, a current action being taken by the user. The computing system determines, based on the current action, a degree of likelihood of whether the user will be able to take the future action and predicts, based on the degree of likelihood, that the user will not be able to take the future action. The computing system sends information to the computing device indicating that the current action being taken by the user will lead to the user not being able to take the future action.

8 Claims, 5 Drawing Sheets

(56) References Cited

U.S. PATENT DOCUMENTS

| | | | |
|---|---|---|---|
| 2009/0105934 A1* | 4/2009 | Tajima | G01C 21/3617 701/118 |
| 2009/0150156 A1* | 6/2009 | Kennewick | G06Q 30/0261 704/257 |
| 2010/0134324 A1* | 6/2010 | Kim | G08G 1/092 340/994 |
| 2013/0218824 A1 | 8/2013 | Wang et al. | |
| 2013/0268865 A1* | 10/2013 | Rhim | G06F 3/0484 715/751 |
| 2013/0345961 A1* | 12/2013 | Leader | G01C 21/3617 701/410 |
| 2014/0171146 A1* | 6/2014 | Ma | H04M 1/72569 455/550.1 |
| 2014/0278070 A1* | 9/2014 | McGavran | G01C 21/00 701/465 |
| 2014/0309864 A1* | 10/2014 | Ricci | H04W 4/21 701/36 |
| 2014/0343841 A1 | 11/2014 | Faaborg et al. | |
| 2014/0372175 A1 | 12/2014 | Jain et al. | |

OTHER PUBLICATIONS

European Patent Office; Examination Report issued in EP Application No. 16736696.2; dated Sep. 5, 2018.
Russian Patent Office; Office Action issued in Application No. 2017137746 dated Dec. 24, 2018.
Russian Patent Office; Decision to Grant issued in Application No. 2017137746 dated May 16, 2019.
European Patent Office; EP Summons issued in Application No. 16736696 dated Jan. 14, 2020.

\* cited by examiner

DETECTING AND CORRECTING POTENTIAL ERRORS IN USER BEHAVIOR

BACKGROUND

Some computing devices (e.g., a wearable device or a mobile phone) may function as personal assistants that are configured to execute search queries for, or notify users about, upcoming flights, nearby attractions, and other information that may be of interest to a user. For example, a computing device may have access to a digital calendar of a user and the computing device may alert the user when to begin traveling from a current location to arrive on-time to a future meeting or event. Or in another example, a computing device may have access to a shopping history of a user and the computing device may suggest certain products or services that would work with a product purchased by the user in the past, as opposed to other products and services that would be incompatible with a past purchase. Nevertheless, even with all the helpful reminders and access to information that some computing devices provide, the reminders and access to information may not always prevent individual users from making decisions and taking certain actions that lead to mistakes being made in their everyday lives.

SUMMARY

In one example, the disclosure is directed to a method that includes predicting, by a computing system, a future action to be taken by a user of a computing device, determining, by the computing system, based on contextual information associated with the computing device, a current action being taken by the user, determining, by the computing system, based on the current action, a degree of likelihood of whether the user will be able to take the future action, and predicting, by the computing system, based on the degree of likelihood, that the user will not be able to take the future action. The method further includes sending, from the computing system, to the computing device, information indicating that the current action being taken by the user will lead to the user not being able to take the future action.

In another example, the disclosure is directed to a computing system that includes at least one processor; and at least one module operable by the at least one processor to predict a future action to be taken by a user of a computing device, determine, based on contextual information associated with the computing device, a current action being taken by the user, and determine, based on the current action, a degree of likelihood of whether the user will be able to take the future action. The at least one module is further operable by the at least one processor to predict, based on the degree of likelihood, that the user will not be able to take the future action, and send, to the computing device, information indicating that the current action being taken by the user will lead to the user not being able to take the future action.

In another example, the disclosure is directed to a computer-readable storage medium including instructions that, when executed, cause at least one processor of a computing system to predict a future action to be taken by a user of a computing device, determine, based on contextual information associated with the computing device, a current action being taken by the user, and determine, based on the current action, a degree of likelihood of whether the user will be able to take the future action. The instructions, when executed, further cause the at least one processor of the computing system to predict, based on the degree of likelihood, that the user will not be able to take the future action, and send, to the computing device, information indicating that the current action being taken by the user will lead to the user not being able to take the future action.

The details of one or more examples are set forth in the accompanying drawings and the description below. Other features, objects, and advantages of the disclosure will be apparent from the description and drawings, and from the claims.

DETAILED DESCRIPTION

In general, techniques of this disclosure may enable a computing system to infer, based on contextual information about a computing device, a current action being taken by a user of the computing device and predict whether, by taking the current action, the user will be able to take a future action. In response to determining that by taking the current action, the user will be unable to take the future action, the computing system may send the computing device information indicating as much. In other words, by observing actions of a user inferred from a context of a computing device, the computing system may determine when the user is not doing what the computing system expects the user to be doing, and may send information to the computing device to notify the user that he or she is doing something unexpected. In some examples, the computing system may provide the computing device with information indicative of a corrective action that the user may take to increase the user's chances of being able to take the future action. In other examples, the computing system may at least provide the computing device with information for informing the user that he or she is doing something unexpected so that the user can confirm that he or she is not potentially missing anything or making a mistake.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

Figure 1:
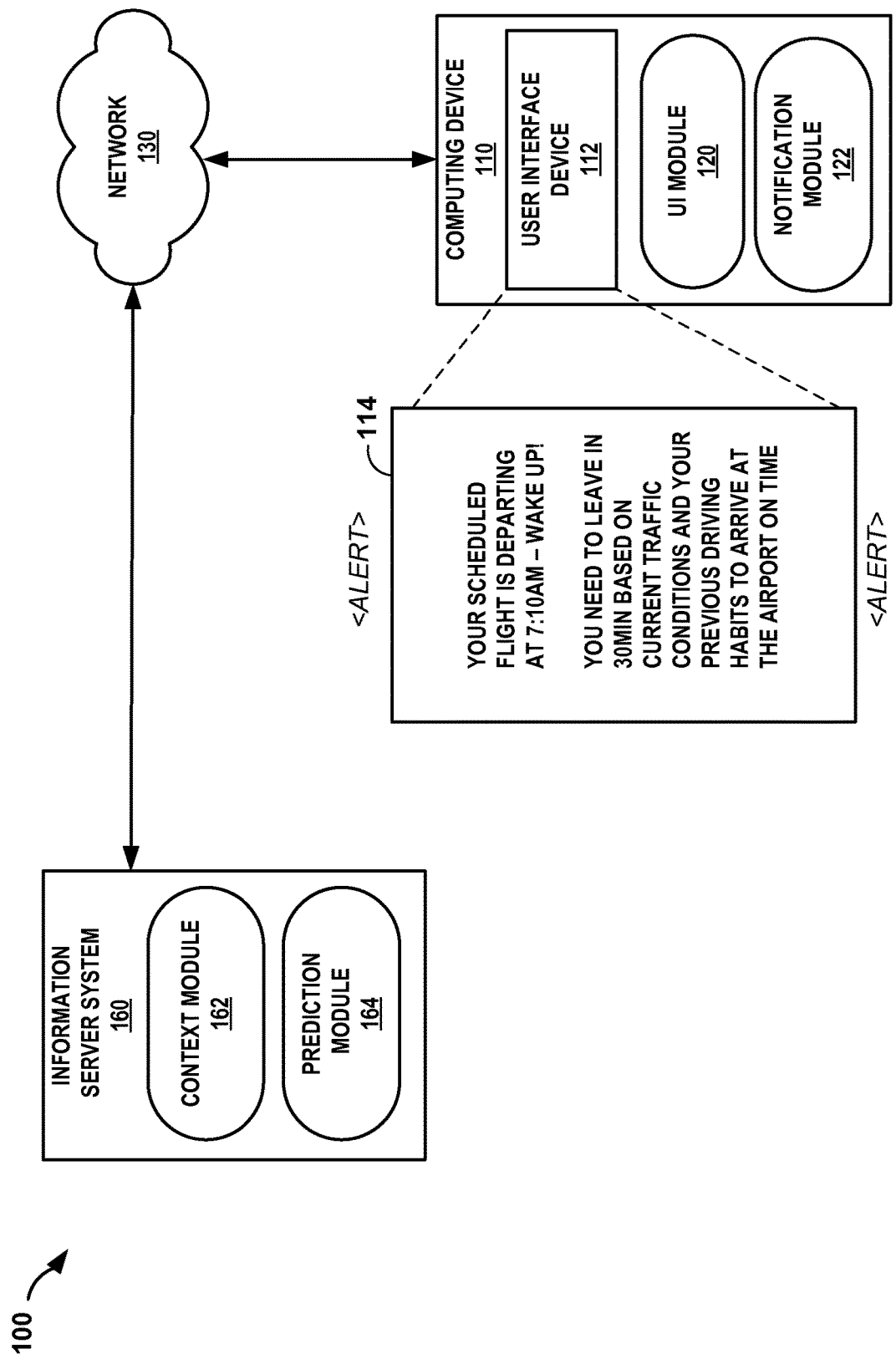
FIG. 1 is a conceptual diagram illustrating an example system for predicting whether a user of a computing device will be able to take a future action, in accordance with one or more aspects of the present disclosure.

FIG. 1 is a conceptual diagram illustrating system 100 as an example system for predicting whether a user of a computing device 110 will be able to take a future action, in accordance with one or more aspects of the present disclosure. System 100 includes information server system ("ISS") 160 in communication with computing device 110 via network 130. ISS 160 may detect expected actions (e.g., likely destinations) associated with a user of computing device 110 and then observe behavior of the user and computing device (e.g., using location service) 110 and intervene by alerting computing device 110 when ISS 160 deems that a mistake in behavior is likely being observed. ISS 160 may use a model for predicting a destination of a user of computing device 110 and observe a user's actual behavior using a location tracking or location history service. ISS 160 may compare observed behavior with expected behavior and if ISS 160 determines that the user is not taking actions that will lead to the expected behavior, ISS 160 may notify computing device 110 to alert the user that he or she may be making a mistake which could prevent the user from preforming performing the expected action.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between ISS 160 and computing device 110. Computing device 110 and ISS 160 may transmit and receive data across network 130 using any suitable communication techniques.

ISS 160 and computing device 110 may each be operatively coupled to network 130 using respective network links. The links coupling computing device 110 and ISS 160 to network 130 may be Ethernet, ATM or other types of network connections, and such connections may be wireless and/or wired connections.

Computing device 110 represents an individual mobile or non-mobile computing device. Examples of computing device 110 include a mobile phone, a tablet computer, a laptop computer, a desktop computer, a server, a mainframe, a set-top box, a television, a computerized watch, computerized eyewear, computerized gloves, or any other type of portable computing device, a personal digital assistants (PDA), portable gaming systems, media players, e-book readers, mobile television platforms, automobile navigation and entertainment systems, or any other types of mobile, non-mobile, wearable, and non-wearable computing devices configured to receive information via a network, such as network 130.

Computing device 110 includes user interface device (UID) 112 and user interface (UI) module 120. In addition, computing device 110 includes query module 122. Modules 120-122 may perform operations described using software, hardware, firmware, or a mixture of hardware, software, and firmware residing in and/or executing at respective computing device 110. Computing device 110 may execute modules 120-122 with multiple processors or multiple devices. Computing device 110 may execute modules 120-122 as virtual machines executing on underlying hardware. Modules 120-122 may execute as one or more services of an operating system or computing platform. Modules 120-122 may execute as one or more executable programs at an application layer of a computing platform.

UID 112 of computing device 110 may function as an input and/or output device for computing device 110. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. In addition, UID 112 may include microphone technologies, infrared sensor technologies, or other input device technology for use in receiving user input.

UID 112 may function as output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. In addition, UID 112 may include speaker technologies, haptic feedback technologies, or other output device technology for use in outputting information to a user.

UID 112 may each include respective presence-sensitive displays that may receive tactile input from a user of computing device 110. UID 112 may receive indications of tactile input by detecting one or more gestures from a user (e.g., the user touching or pointing to one or more locations of UID 112 with a finger or a stylus pen). UID 112 may present output to a user, for instance at respective presence-sensitive displays. UID 112 may present the output as a graphical user interface (e.g., user interface 114), which may be associated with functionality provided by computing device 110. For example, UID 112 may present various user interfaces (e.g., user interface 114) related to search functions provided by query module 122 or other features of computing platforms, operating systems, applications, and/or services executing at or accessible from computing device 110 (e.g., electronic message applications, Internet browser applications, mobile or desktop operating systems, etc.).

UI module 120 may manage user interactions with UID 112 and other components of computing device 110. UI module 120 may cause UID 112 to output a user interface, such as user interface 114 (or other example user interfaces) for display, as a user of computing device 110 view output and/or provides input at UID 112. UI module 120 and UID 112 may receive one or more indications of input from a user as the user interacts with the user interface, at different times and when the user and computing device 110 are at different locations. UI module 120 and UID 112 may interpret inputs detected at UID 112 and may relay information about the inputs detected at UID 112 to one or more associated platforms, operating systems, applications, and/or services executing at computing device 110, for example, to cause computing device 110 to perform functions.

UI module 120 may receive information and instructions from one or more associated platforms, operating systems, applications, and/or services executing at computing device 110 and/or one or more remote computing systems, such as ISS 160. In addition, UI module 120 may act as an intermediary between the one or more associated platforms, operating systems, applications, and/or services executing at computing device 110, and various output devices of computing device 110 (e.g., speakers, LED indicators, audio or electrostatic haptic output device, etc.) to produce output (e.g., a graphic, a flash of light, a sound, a haptic response, etc.) with computing device 110.

In the example of FIG. 1, user interface 114 is a graphical user interface associated with a prediction service provided by ISS 160 and accessed by computing device 110. As described in detail below, user interface 114 includes graphical information (e.g., text), which represents information ISS 160 predicts that a user of computing device 110 may need at the current time to perform a future task or to at least avoid making a mistake by taking a current action that inhibits the user from performing the future task. User interface 14 may include various other types of graphical indications such as visual depictions of predicted information that a user of computing device 110 may need to perform a future task or to at least avoid making a mistake by taking a current action that inhibits the user from performing the future task. UI module 120 may cause UID 112 to output user interface 114 based on data UI module 120 receives via network 130 from ISS 160. UI module 120 may receive graphical information (e.g., text data, images data, etc.) for presenting user interface 114 as input from ISS 160 along with instructions from ISS 160 for presenting the graphical information within user interface 114 at UID 112.

Notification module 122 performs notification management related functions for computing device 110. Notification module 122 may receive notification data from applications and services executing at computing device 110, as well as notification related data from ISS 160 and, in response, may output an indication of the information contained in the notification data to UI module 120 for presentation at UID 112. Notification module 120 may receive notification data from a prediction service provided by ISS 160 and accessed by computing device 110. The prediction service may send notification data to notification module 122 that includes information about a corrective action that a user of computing device 110 could take to correct the user's current action and ensure that the user takes a future action. Notification module 120 may output information about the corrective action to UI module 120 for presentation at UID 112 (e.g., as user interface 114).

As used throughout the disclosure, the term "notification data" is used to describe various types of information that may indicate the occurrence of an event associated with various platforms, applications, and services executing within an execution environment at one or more computing devices, such as computing device 110. For example, notification data may include, but is not limited to, information specifying an event such as: the receipt of a communication message (e.g., e-mail, instant message, SMS, etc.) by a messaging account associated with a computing device, the receipt of information by a social networking account associated with computing device 110, a reminder of a calendar event (meetings, appointments, etc.) associated with a calendar account of computer device 110, information generated and/or received by a third-party application executing at computing device 110, the transmittal and/or receipt of inter-component communications between two or more components of platforms, applications, and/or services executing at computing device 110, etc. In addition to including information about a specific event, such as the various events described above, notification data may include various attributes or parameters embedded within the notification data that specify various characteristics of the notification data. For example the notification data may include a portion of data (e.g., a bit, metadata, a field, etc.) that specifies the origin of the notification data (e.g., the platform, application, and/or service that generated the notification data).

ISS 160 represents any suitable remote computing system, such as one or more desktop computers, laptop computers, mainframes, servers, cloud computing systems, etc. capable of sending and receiving information both to and from a network, such as network 130. ISS 160 hosts (or at least provides access to) both a search system for searching for information and a prediction system for predicting whether, for a particular context, a user of computing device 110 will be able to take a future action.

Computing device 110 may communicate with ISS 160 via network 130 to access the search system and prediction system provided by ISS 160. In some examples, ISS 160 represents a cloud computing system that provides search and prediction services through network 130 to one or more computing device 110 that access the search and prediction services via access to the cloud provided by ISS 160.

In the example of FIG. 1, ISS 160 includes context module 162 and prediction module 164. Together, modules 162 and 164 provide a prediction service accessible to computing device 110 and other computing devices connected to network 130 for receiving useful information that ISS 160 predicts will be of interest to a user. Modules 162 and 164 may perform operations for building a model of user behavior for predicting when a user of computing device 110 may be making a mistake (e.g., by deviating from an expected behavior) which could potentially have a large impact on their life.

Modules 162 and 164 may perform operations described using software, hardware, firmware, or a mixture of hardware, software, and firmware residing in and/or executing at ISS 160. ISS 160 may execute modules 162 and 164 with multiple processors or multiple devices. ISS 160 may execute modules 162 and 164 as virtual machines executing on underlying hardware. Modules 162 and 164 may execute as one or more services of an operating system or computing platform. Modules 162 and 164 may execute as one or more executable programs at an application layer of a computing platform.

As used throughout the disclosure, the term "contextual information" is used to describe information that can be used by a computing system and/or computing device, such as information server system 160 and computing device 110, to define one or more physical and/or virtual, environmental characteristics associated with computing devices and/or users of computing devices in addition to one or more observable physical or virtual actions being taken by users of computing devices at a particular time. In other words, contextual information represents any data that can be used by a computing device and/or computing system to determine a "user context" indicative of the circumstances that form the virtual and/or physical experience the user is undergoing for a particular location at a particular time.

Examples of contextual information include past, current, and future physical locations, degrees of movement, magnitudes of change associated with movement, weather conditions, traffic conditions, patterns of travel, patterns of movement, application usage, calendar information, purchase histories, Internet browsing histories, and the like. In some examples, contextual information may include sensor information obtained by one or more sensors (e.g., gyroscopes, accelerometers, proximity sensors) of computing devices, such as computing device 110, radio transmission information obtained from one or more communication units and/or radios (e.g., global positioning system (GPS), cellular, Wi-Fi) of computing devices, information obtained by one or more input devices (e.g., cameras, microphones, keyboards, touchpads, mice) of computing devices, and network/device identifier information (e.g., a network name, a device internet protocol address). In some examples, contextual information may include communication information such as information derived from e-mail messages, text messages, voice mail messages or voice conversations, calendar entries, task lists, social media network related information, and any other information about a user or computing device that can support a determination of a user context.

Context module 162 may process and analyze contextual information associated with computing device 110 to define a context of computing device 110. The context of computing device 110 may specify one or more characteristics associated with the user of computing device 110 and his or her physical and/or virtual environment at various locations and times. For example, context module 162 may determine, as part of a context of computing device 110, a physical location associated with computing device 110 at a particular time based on the contextual information associated with computing device 110 from that particular time. As the contextual information changes (e.g., based on sensor information indicative of movement over time), context module 162 may update the physical location in the determined context of computing device 110.

The types of information that define a context of a computing device for a particular location and/or time are too numerous to list. As some examples, a context of a computing device may specify: a location, a movement trajectory, a direction, a speed, a name of an establishment, a street address, a type of place, a building, weather conditions, and traffic conditions, at various locations and times. The context of the computing device may further include calendar information that defines a meeting or an event associated with various locations and times, webpage addresses viewed at various locations and times, text entries made in data fields of the webpages viewed at various locations and times (e.g., search or browsing histories), and other application usage data associated with various locations and times. The context of the computing device may further include information about audio and/or video streams accessed by the computing device at various locations and times, television or cable/satellite broadcasts accessed by the computing device at various locations and times, and information about other services accessed by the computing device at various locations and times.

Context module 162 may maintain past and future contextual histories associated with the user of computing device 110. Context module 162 may catalog and record previous contexts of computing device 110 at various locations and times in the past and from the previously recorded contexts, may project or infer future contexts of computing device 110 at various future locations and future times. Context module 162 may associate future days and future times with the recurring contexts of prior days and times to build a future contextual history associated with the user of computing device 110.

For example, the information contained in a past contextual history of computing device 110 may indicate the location of the user during the user's typical work week as the user travels along a typical route to and from a work location to a home location. Based on the past contextual history, context module 162 may produce a future contextual history that includes information indicating expected locations of the user during a future work week that mirror the actual locations recorded in the past contextual history.

Context module 162 may supplement a future contextual history associated with the user of computing device 110 with information stored on an electronic calendar or information mined from other communications information associated with computing device 110. For example, the electronic calendar may include a location associated with an event or appointment occurring at a future time or day when the user is typically at a home location. Rather than include the home location during the future time or day of the event as the expected location in the future contextual history, context module 162 may include event location as the expected location during the future time or day of the event.

Context module 162 may share the past location histories with prediction module 164 and prediction module 164 may use the past location histories to better predict, infer, or confirm a current action being taken by a user at a particular time. Context module 162 may respond to a request from prediction module 164 of ISS 160 for a current context associated with computing device 110 and or a future context associated with computing device 110, by outputting data to prediction module 164 that specifies the current or future context of computing device 110.

Prediction module 164 learns and predicts current and future actions of users of computing devices, such as computing device 110, for different contexts. Prediction module 164 can predict, based on a current context received from context module 162, what a user is doing for a current context and can predict, based on a future context received from context module 162, what the user will be doing for the future context.

As part of a prediction service accessed by computing device 110, prediction module 164 may automatically output notification data or other information to notification module 122 of computing device 110 for alerting a user of a correction that the user could take to a current action as a way to ensure that a future action is taken. Said differently, prediction module 164 may determine whether a current action being performed by a user in a current context is more likely or less likely to lead to the user being able to perform a future action in a future context.

Prediction module 164 is described in greater detail with respect to the additional FIGS. In summary, prediction module 164 may perform one or more machine learning techniques to learn and model actions that users of computing device 110 and other computing devices typically take for different contexts. Through learning and modeling actions for different contexts, prediction module 164 may generate one or more rules for predicting actions that the user of computing device 110 takes for a particular context.

For example, using rules generated prediction module 164 about past observations related to actions being taken by a user of computing device 110, as well as users of other computing devices, for different contexts, prediction module 164 can guess or infer what a user of computing device 110 is doing for a particular context. As one example, prediction module 164 may infer that when computing device 110 is moving along a particular travel route on a particular day that the user is "driving to work" or "commuting home." As another example, prediction module 164 may determine that when computing device 110 is located in a user's living room on Sunday afternoons in the fall and winter seasons, that the user is watching a particular sports broadcast. As yet another example, prediction module 164 may predict that when computing device 110 is stationary for prolonged periods of time during the late evening or early morning hours of a day that the user is sleeping. And as still another example, prediction module 164 may predict that when computing device 110 is standing in-line at an airport that the user is moving through a gate security check.

In addition, through learning and modeling actions for different contexts, prediction module 164 may generate one or more additional rules for predicting whether current actions that the user of computing device 110 is taking for a current context, will or will not lead to a user of computing device 110 successfully performing a future action, in a future context. The one or more additional rules may output a degree of likelihood (e.g., a score, a probability, a value, etc.) indicative of whether the user will, by performing the current action, still successfully be able to perform the future action. Prediction module 164 may compare the degree of likelihood being output from the one or more additional rules to one or more thresholds and if the degree of likelihood satisfies a threshold indicating that the user will not be able to perform the future action, prediction module 164 may output notification data for alerting the user to his or her potential failure or future mistake.

In accordance with the techniques of this disclosure, ISS 160 may detect and attempt to correct user error that may have a large impact on the user's life. For instance, ISS 160 may infer an expected future destination of a user of computing device 110 and then, after observing the change in location and movement trajectory of the user of computing device 110 that indicates the user may not actually reach the expected future destination, intervene and alert the user to his or her potential mistake.

Consider an example scenario in which a user of computing device 110 plans to fly from London to Zurich in the early morning hours on a particular day. An electronic calendar or a confirmation e-mail received by computing device 110 may indicate that the flight is scheduled to depart at 7:10 AM. In a worst case outcome, the user may accidentally switch-off his or her alarm the morning of departure, only to wake up too late to leave for the airport to catch the flight. Rather than let the user sleep-in and potentially miss the flight, ISS 160, in accordance with techniques of this disclosure, may predict that the user has slept past his alarm on the day of the flight and automatically send notification data to computing device 110 to cause computing device 110 to alert the user and wake the user in time to catch the flight.

In operation, for instance, to alert the user of computing device 110 to wake in time to catch the flight on the calendar of computing device 110, ISS 160 may predict future actions to be taken by a user of computing device 110. For example, prediction module 164 may periodically or occasionally query context module 162 for a future context of computing device 110. In response to the query from prediction module 164, context module 162 may determine based on contextual information received from computing device 110 (e.g., calendar information, communication information, or other contextual information as described above) a future context of computing device 110 and send the future context to prediction module 164.

Based on the future context received from context module 162, prediction module 164 may infer, using a machine learning or other rules based system, a future action that might be taken by the user, given that future context. For example, in response to receiving a future context that indicates the user of computing device 110 will be at an airport by 6:00 AM to catch a flight that leaves at 7:10 AM, the machine learning or other rules based system of prediction module 164 may predict that the user of computing device 110 will be departing for the airport at 5:30 AM to make the thirty minute drive to the airport.

ISS 160 may determine, based on contextual information associated with computing device 110, a current action being taken by the user, and based on the current action, determine a degree of likelihood of whether the user will be able to take the future action. For instance, given that prediction module 164 may expect the user of computing device 110 to begin traveling to the airport by 5:30 AM, prediction module 164 may query context module 162 at 5:00 AM for information about the current context of computing device 110 to determine if the user is on track to perform the expected action of begin traveling to the airport in time to catch the flight. The current context determined by context module 162 may indicate a lack of movement associated with computing device 110 at a home location of the user and may mimic movement patters (or lack-there-of) to prediction module 164 that the user may be sleeping.

ISS 160 may determine, based on the current action, a degree of likelihood (e.g., a probability, a score, a binary value, etc.) of whether the user will be able to take the future action. In furtherance of the above example, prediction module 164 may input the current action (e.g., sleeping), the future action (e.g., departing for the airport at 5:30 AM), the current context, and the future context, into one or more rules for predicting whether current action that the user of computing device 110 is taking for the current context, will or will not lead to the user of computing device 110 successfully performing the future action, in the future context.

ISS 160 may predict, based on the degree of likelihood that the user will not be able to take the future action and in response, send to computing device 110, information indicating that the current action being taken by the user will lead to the user not being able to take the future action. For example, prediction module 164 may compare the degree of likelihood being output from the one or more additional rules to one or more thresholds. If the degree of likelihood satisfies a threshold (e.g., if the one or more rules give the user a greater than 50% chance of departing for the airport on time if he or she is currently sleeping), prediction module 164 may refrain from outputting notification data to computing device 110. Conversely, if the degree of likelihood does not satisfy a threshold (e.g., if the one or more rules give the user a less than 50% chance of departing for the airport on time if he or she is currently sleeping), prediction module 164 may output notification data for alerting the user to his or her potential failure or future mistake. Prediction module 164 may learn and tune the thresholds used by the machine learning and rules based systems overtime to improve the chances of notifying a user that he or she may be making a mistake.

In some examples, prediction module 164 may determine the degree of likelihood of whether the user will be able to take the future action by decreasing the degree of likelihood in response to determining the current time is within a threshold time of the future time and not decreasing or increasing the degree of likelihood in response to determining the current time is not within a threshold time of the future time. For example, prediction module 164 may determine that the user is sleeping within a half-hour threshold amount of time of the latest departure time at which the user could leave a current location to arrive at the airport by a latest arrival time. Response to determining that the user is sleeping within the half-hour threshold, prediction module 164 may decrease the likelihood that the user of computing device 110 will be able to perform the future action and leave on-time. Response to determining that the user is sleeping outside the half-hour threshold, prediction module 164 may refrain from decreasing or even increase the likelihood that the user of computing device 110 will be able to perform the future action and leave on-time.

The notification data that computing device 110 outputs in response to determining the degree of likelihood indicates that the user will not be able to perform the future action may, once received by computing device 110, cause computing device 110 to ring loudly or sound an alarm for waking the user. In some examples, computing device 110 may cause the lights, television, or other form of notification to switch-on to wake the user. In some examples, the notification data may cause notification module 122 to output through UI module 120, a graphical user interface at UID 112 for notifying the user to wake-up to leave on-time. In other words, ISS 160 may send notification data to computing device 110 such that when the user of computing device 110 has an early morning flight and the user has failed to start moving towards the airport, computing device 110 proactively alerts the user (e.g., by producing an acoustic alert) that signals the user until computing device 110 detects that he or she has interacted with computing device 110 (e.g. as an indication the user heard, viewed, or felt the alert).

Accordingly, when a user of a computing device that receives information from an example computing system that performs the techniques described herein, the user may be less likely to continue preforming actions that could lead to an inability to perform future actions that the system expects the user to take in a future context. Instead, the example system may automatically infer that the user could be making a mistake, and notify the user of his or her potential for failure.

In this way, unlike other computing devices and systems that simply provide reminders and access to information but may still allow a user to go in a direction or to take an action that could lead to a mistake being made in their everyday lives, the example system takes additional steps to ensure that mistakes are avoided and the future actions associated with the reminders and information are actually accomplished. Even if the user is unaware that he or she is making a mistake, the example system will still automatically provide information to guide the user back to avoid making the mistake.

Consequently, the user need not even be aware he or she is making a mistake, the computing system can infer whether the user may need to take corrective action to a current action without user input. The user may experience less stress and spend less time going down the wrong path towards a future action and less time correcting course to avoid making a mistake. By correcting potential mistakes earlier rather than later, the example system may enable the computing device to receive fewer inputs from a user searching for information to try and correct or rectify a mistake. With fewer inputs to correct potential failures, the example system may enable computing devices to conserve energy and use less battery power as compared to other systems that merely provide a user with capability to receive reminders or search for information.

Figure 2:
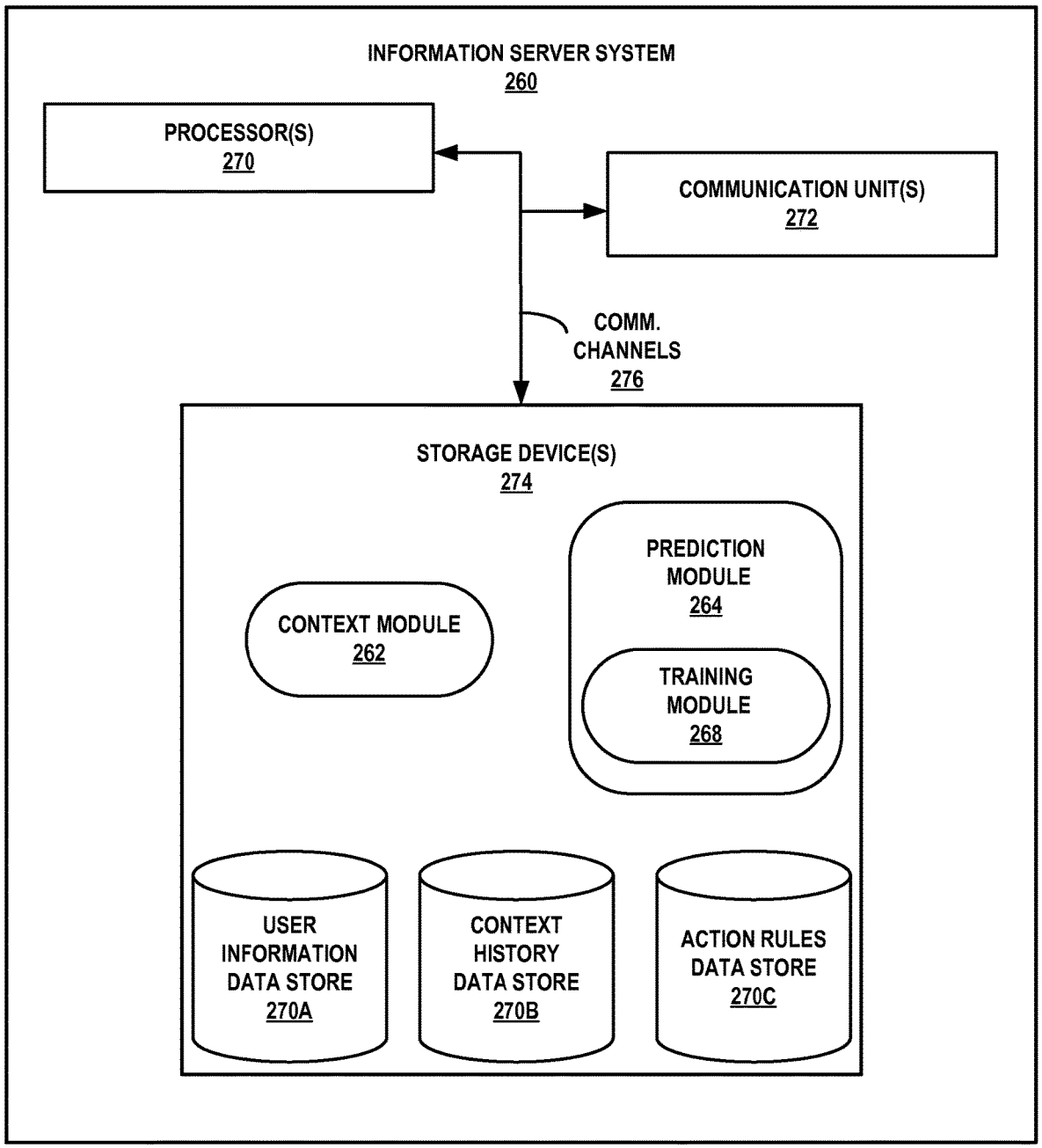
FIG. 2 is a block diagram illustrating an example computing system configured to predict whether a user of a computing device will be able to take a future action, in accordance with one or more aspects of the present disclosure.

FIG. 2 is a block diagram illustrating information server system (ISS) 260 as an example computing system configured to predict whether a user of computing device 110 of FIG. 1 will be able to take a future action, in accordance with one or more aspects of the present disclosure. ISS 260 is a more detailed example of ISS 160 of FIG. 1 and is described below within the context of system 100 of FIG. 1. FIG. 2 illustrates only one particular example of ISS 260, and many other examples of ISS 260 may be used in other instances and may include a subset of the components included in example ISS 260 or may include additional components not shown in FIG. 2.

ISS 260 provides computing device 110 with a conduit through which a computing device, such as computing device 110, may access a service for receiving information that ISS 260 automatically predicts will assist a user of the computing device in correcting a current action so as to ensure that the user takes a future action and avoids making a mistake. As shown in the example of FIG. 2, ISS 260 includes one or more processors 270, one or more communication units 272, and one or more storage devices 274. Storage devices 274 of ISS 260 include context module 262 and prediction module 264. Within prediction module 264, storage devices 74 includes training module 268. Modules 262 and 264 include at least the same, if not more, capability as, respectively, modules 162 and 164 of FIG. 1.

Storage devices 274 of ISS 260 further includes user information data store 270A, context history data store 270B, and action rules data store 270C (collectively, "data stores 270"). Communication channels 276 may interconnect each of the components 270, 272, and 274 for inter-component communications (physically, communicatively, and/or operatively). In some examples, communication channels 276 may include a system bus, a network connection, an inter-process communication data structure, or any other method for communicating data.

One or more communication units 272 of ISS 260 may communicate with external computing devices, such as computing device 110 of FIG. 1, by transmitting and/or receiving network signals on one or more networks, such as network 130 of FIG. 1. For example, ISS 260 may use communication unit 272 to transmit and/or receive radio signals across network 130 to exchange information with computing device 110. Examples of communication unit 272 include a network interface card (e.g. such as an Ethernet card), an optical transceiver, a radio frequency transceiver, a GPS receiver, or any other type of device that can send and/or receive information. Other examples of communication units 272 may include short wave radios, cellular data radios, wireless Ethernet network radios, as well as universal serial bus (USB) controllers.

Storage devices 274 may store information for processing during operation of ISS 260 (e.g., ISS 260 may store data accessed by modules 262, 264, and 268 during execution at ISS 260). In some examples, storage devices 274 are a temporary memory, meaning that a primary purpose of storage devices 274 is not long-term storage. Storage devices 274 on ISS 260 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 274, in some examples, also include one or more computer-readable storage media. Storage devices 274 may be configured to store larger amounts of information than volatile memory. Storage devices 274 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 274 may store program instructions and/or data associated with modules 262, 264, and 268.

One or more processors 270 may implement functionality and/or execute instructions within ISS 260. For example, processors 270 on ISS 260 may receive and execute instructions stored by storage devices 274 that execute the functionality of modules 262, 264, and 268. These instructions executed by processors 270 may cause ISS 260 to store information, within storage devices 274 during program execution. Processors 270 may execute instructions of modules 262, 264, and 268 to predict whether a user of a computing device will be able to take a future action, for various contexts, given the previous actions of other users of other computing devices, for the same contexts, and automatically provide information based on the prediction to other computing devices. That is, modules 262, 264, and 268 may be operable by processors 270 to perform various actions or functions of ISS 270 which are described herein.

The information stored at data stores 270 may be searchable and/or categorized. For example, one or more modules 262, 264, and 268 may provide input requesting information from one or more of data stores 270 and in response to the input, receive information stored at data stores 270. Information server system 260 may provide access to the information stored at data stores 270 as a cloud based, data-access service to devices connected to network 130, such as computing device 110. When data stores 270 contain information associated with individual users or when the information is genericized across multiple users, all personally-identifiable-information such as name, address, telephone number, and/or e-mail address linking the information back to individual people may be removed before being stored at information server system 260. Information server system 260 may further encrypt the information stored at data stores 270 to prevent access to any information stored therein. In addition, information server system 260 may only store information associated with users of computing devices if those users affirmatively consent to such collection of information. Information server system 260 may further provide opportunities for users to withdraw consent and in which case, information server system 260 may cease collecting or otherwise retaining the information associated with that particular user.

Data store 270A represents any suitable storage medium for storing searchable information related to a user of a computing device, such as computing device 110 of FIG. 1. User information data stores 270A and 270C may be primarily maintained by prediction module 264 may be part of, or separate from, contextual history data store 270B which is generally maintained by context module 262. User information data store 270A may include one or more searchable data bases or data structures that organize the different types of information associated with individual users of computing devices, such as computing device 110 of FIG. 1. In some examples, user information data store 270A includes information related to user search histories, e-mail messages, text based messages, voice messages, social networking information, photos, application data, application usage information, purchase histories, and any and all other information associated with a user and the user's interaction with a computing device such as computing device 110. The user information stored at data store 270A may be searchable. For example, context module 262 may provide a particular date and/or time of day as an input into data store 270A and receive as output pieces of user information related to the input. For example, context module 262 may provide as input a particular day and receive information about a flight indicated in a booking confirmation e-mail of a user of computing device 110. Or, as another example, context module 262 may receive an indication of a keyword query (e.g., a character string) and output an appointment, a purchase that is associated with the keyword.

Data store 270B represents any suitable storage medium for storing searchable contextual histories that include contextual information (e.g., locations, times of day, weather information, traffic information, navigational information, device state information, user information, etc.) organized by date and time. Data store 270B may include past contextual histories and/or future contextual histories. Information server system 260, specifically context module 262, may collect contextual information associated with computing devices, such as computing device 110, and store the collected contextual information at data store 270B. Context module 262 may rely on the information stored at context history data store 270B to determine a context of a user or computing device, such as computing device 110.

Data store 270C may store rules (e.g., of a machine learning system) for predicting actions that may be taken by users of computing devices for various contexts. Data store 270C may receive as input a context and provide as output a predicted action being taken by a user in the context. Data store 270C may further store other rules for determining degrees of likelihood indicating whether by performing a current action for a current context a user of a computing device will be able to perform a future "expected" action for a future context. Data store 270C may receive as inputs a current action and a future action and output a degree of likelihood indicating whether the user will be able to perform the future action if continuing to perform the current action.

Task and needs rules data store 270C includes one or more previously developed rules that needs prediction module 264 relies on to predict a task or action likely to be performed by a user of a computing device for a current context as well as information that the user may need to accomplish the task. For example, data store 270C may store rules of a machine learning or artificial intelligence system of needs prediction module 264. The machine learning or artificial intelligence system of needs prediction module 264 may access the rules of data store 270C to infer tasks and needs associated with users of computing device 110 for a particular context.

In some examples, prediction module 264 may provide a context of a computing device as input to data store 270C and receive as output, information pertaining to a task or action that a user of the computing device may perform in the context. In some examples, the rules of data store 270C may output a degree of likelihood (e.g., a count, a probability, etc.) associated with the task or action for the context.

And in some examples, prediction module 264 may provide as input, a current action or task and a predicted or expected action or task to data store 270C and receive as output, information pertaining to whether the current action or task is compatible with the future action or task.

Training module 268 may generate the action rules stored at data store 270C. For example, prediction module 264 may initially receive contexts from context module 162 and provide the contexts as inputs to training module 268. Training module 268 may produce models of user actions, and overtime train or improve the models to better learn and be able to predict the actions and generate the rules for inferring actions of users for given contexts. Once generated by training module 268, prediction module 264 may query context module 262 for an indication of a current or future context of computing device 110. Prediction module 264 may provide the information received from context module 262 about the current or future contexts of computing device 110 as input to the models and, in response, may receive as output, an indication (e.g., data) indicative of one or more tasks, actions, or other physical or virtual observable acts that users typically perform for the particular context.

Training module 268 of prediction module 264 may generate the rules stored at data store 270C for predicting and determining degrees of likelihood associated with tasks being performed by users for certain contexts. For example, a machine learning or artificial intelligence system of training module 268 may analyze the contextual information obtained by context module 262 and stored at data store 270B and identify correlations with the user information stored at data store 270A. Types of machine learning systems used by training module 268 include Bayesian networks, neural networks, and other types of artificial intelligent models. For example, training module 268 may develop a table with a row for each computing device 110 or group of computing devices that share similar contexts and which have users that were performing similar actions at the similar contexts. Based on the correlations between contextual information and the actions, training module 268 may develop rules for predicting future actions or current actions being performed by users of computing devices for particular contexts.

In operation, ISS 260 may predict a future action to be taken by a user of a computing device, such as, attending an event at a future time. For example, prediction module 264 may query context module 262 for an update as to a predicted location or expected context of computing device 110 the next day, next hour, next week, etc. Prediction module 262 may input the future context into action rules data store 270C and receive as output, an indication that the user of computing device 110 will be attending an opera event, a movie, a meeting, or other appointment or event the next day (e.g., Sunday).

ISS 260 may determine, based on contextual information associated with the computing device, a current action being taken by the user. For instance, occasionally, prediction module 264 may query context module 262 for a current context of computing device 110 and determine, using one or more of the rules stored at action rules data store 270C, whether a current action likely being performed in the current context is compatible or will interfere with the user's ability to perform the future action of attending the opera, movie, meeting, or other appointment the next day. Prediction module 262 may input the current context into action rules data store 270C and receive as output, an indication that the user of computing device 110 is taking a preparatory action in preparation for attending the event at the future time by traveling to or has arrived at a local dry cleaner and infer that the user is likely dropping off dry cleaning for the event the next day.

ISS 260 may determine, based on the current action, a degree of likelihood of whether the user will be able to take the future action. For example, prediction module 264 may input the current context, previously determined future context, current action, and expected or future action into action rules data store 270C and receive an indication of a degree of likelihood as to whether the user should be able to drop of dry cleaning he or she will need to attend the event the next day and still be able to attend the event the next day. Action rules data store 270C may decrease, and then output, the degree of likelihood in response to determining the preparatory action cannot be completed within a threshold time of the future time. For instance, action rules data store 270C may output a low degree of likelihood (e.g., a probability less than 50%) since the dry cleaner is closed the next day and therefore the user will be unable to pickup his or her dry cleaning for the event.

ISS 260 may predict, based on the degree of likelihood that the user will not be able to take the future action and send, to computing device 110, information indicating that the current action being taken by the user will lead to the user not being able to take the future action. For example, given the low degree of likelihood, prediction module 264 may generate notification data that ISS 260 may send to computing device 110 to alerting the user that he or she may be making an avoidable mistake by dropping off dry cleaning for an event the next day since the dry cleaner they are at is closed on the day of the event.

In some examples, ISS 260 may determine a corrective action that the user can take to increase the degree of likelihood of whether the user will be able to take the future action and the information send to computing device 110 indicating the current action being taken by the user will lead to the user not being able to take the future action may include an indication of the corrective action. For example, prediction module 264 may perform a search (e.g., an Internet search) for dry cleaners located near the current location of computing device 110 that are open on Sunday (e.g., the day of the event) and recommend that the user travel to one of the other dry cleaners instead.

Figure 3:
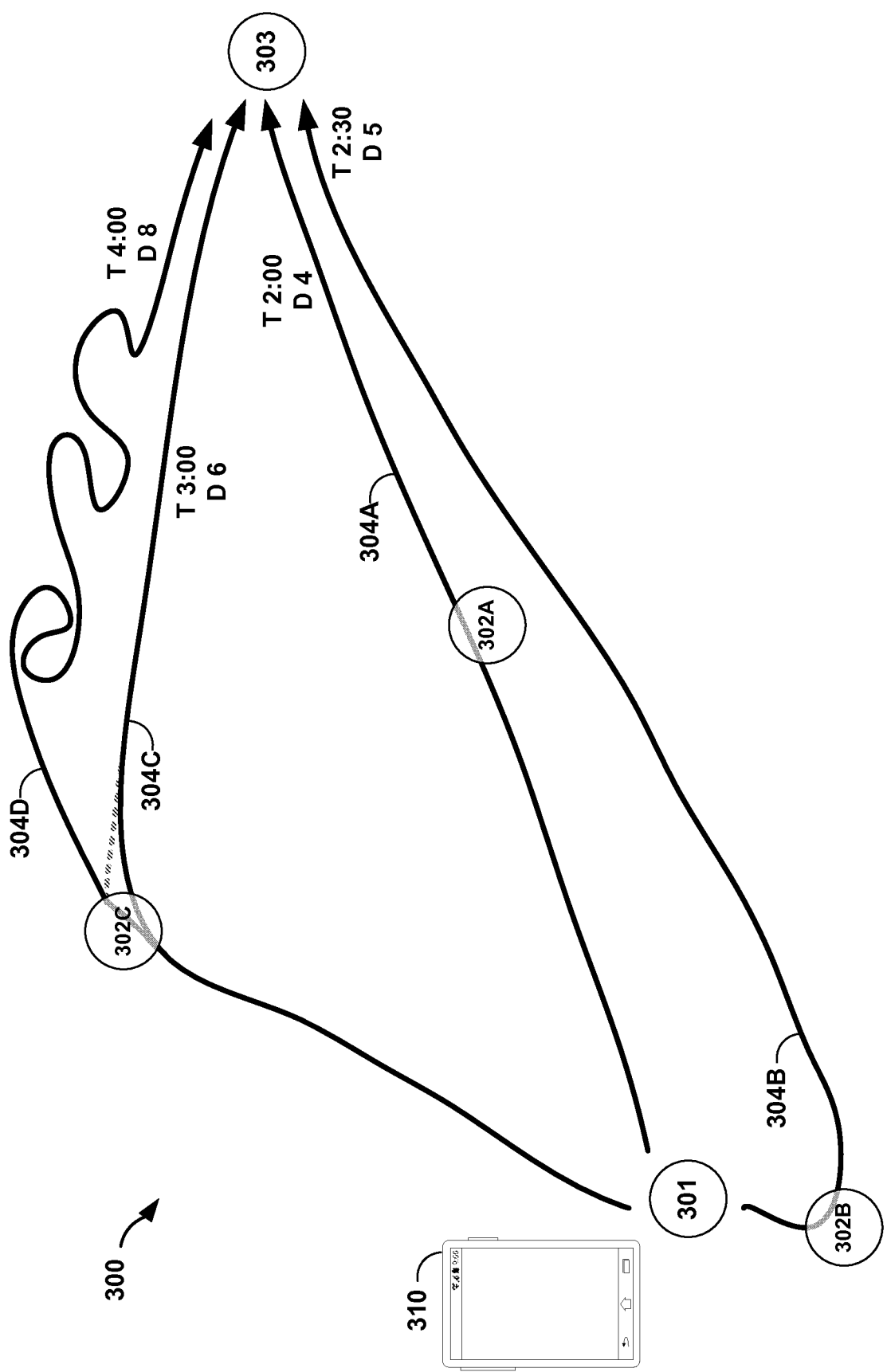
FIG. 3 is a conceptual diagram illustrating an example navigational scenario for an example computing system to predict whether a user of a computing device will be able to take a future action, in accordance with one or more aspects of the present disclosure.

FIG. 3 is a conceptual diagram illustrating an example navigational scenario for an example computing system, such as information server system 160 of FIG. 1 or information server system 260 of FIG. 2, to predict whether a user of a computing device, such as computing device 110 of FIG. 1, will be able to take a future action, in accordance with one or more aspects of the present disclosure. FIG. 3 is described below within the context of system 100 of FIG. 1, where computing device 310 is an example of computing device 110 of FIG. 1.

In the example of FIG. 3, context module 162 of ISS 160 may determine that computing device 310 is at current location 301 at a current time and that a future context of computing device 310 puts computing device 310 at future location 303 at a future time (e.g., three hours later than the current time). FIG. 3 shows paths 304A, 304B, 304C, and 304D from which a user of computing device 310 could take to travel from location 301 to 303.

Path 304A is approximately 4 distance units long and it would take approximately two hours of travel time for the user of computing device 310 to travel from location 301 to 303. Path 304A intersects with location 302A. Path 304B is approximately 5 distance units long and it would take approximately two and one half hours of travel time for the user of computing device 310 to travel from location 301 to 303. Path 304B intersects with location 302B. Path 304C is approximately 6 distance units long and it would take approximately three hours of travel time for the user of computing device 310 to travel from location 301 to 303. Path 304C intersects with location 302C. Path 304D also intersects with location 302C. However path 304D is approximately 8 distance units long and it would take approximately four hours of travel time for the user of computing device 310 to travel from location 301 to 303.

In one example, context module 162 of ISS 160 may detect movement associated with computing device 310 as computing device 310 moves along the trajectory of path 304A towards location 302A and send an updated current context associated with computing device 310 to prediction module 164. Prediction module 164 may determine a degree of likelihood of whether the user of computing device 310, by traveling towards location 302A at a current time, will be able to arrive at location 303 by the future time. For example, prediction module 164 may determine an estimated arrival time for the user of computing device 310 to arrive at future location 303 after traveling from location 301 to location 302B. Prediction module 164 may increase the degree of likelihood in response to determining the estimated arrival time is within a threshold time (e.g., within a tolerance of acceptable arrival at location 303 in order for the user to arrive on time) of the future time. For example, prediction module 164 may determine that taking path 304A through location 302A, the user of computing device 310 will most certainly still arrive at location 303 on time.

In another example, context module 162 of ISS 160 may detect movement associated with computing device 310 as computing device 310 moves along the trajectory of path 304B towards location 302B and send an updated current context associated with computing device 310 to prediction module 164. Even though prediction module 164 may determine that computing device 310 is moving on a trajectory away from location 303 at a current time, prediction module 164 may refrain from alerting computing device 310 of a potential mistake until prediction module 164 determines a degree of certainty as to whether the user, by traveling along path 304B towards location 302B at the current time, will be able to arrive at location 303 by the arrival time. Prediction module 164 may increase the degree of likelihood in response to determining an estimated arrival time is within a threshold time (e.g., less than) of the future time. For example, prediction module 164 may determine that even by taking path 304B through location 302B, the user of computing device 310 will certainly still arrive at location 303 on time.

In a different example, context module 162 of ISS 160 may detect movement associated with computing device 310 as computing device 310 moves along the trajectory of path 304D towards location 302C and send an updated current context associated with computing device 310 to prediction module 164. Prediction module 164 may determine a degree of likelihood of whether the user of computing device 310, by traveling towards location 302C at a current time, will be able to arrive at location 303 by the future time. For example, prediction module 164 may determine an estimated arrival time for the user of computing device 310 to arrive at future location 303 after traveling from location 301 to location 302C while continuing on the trajectory of path 304D. Prediction module 164 may decrease the degree of likelihood in response to determining the estimated arrival time is not within a threshold time (e.g., outside a tolerance of acceptable arrival time at location 303 in order for the user to arrive on time) of the future time. For example, prediction module 164 may determine that taking path 304D through location 302C, the user of computing device 310 will most certainly not arrive at location 303 on time. Responsive to determining that the user of computing device 310 will likely not arrive on-time, prediction module 164 may send information to computing device 310 for alerting the user of a potential mistake in continuing to travel along path 304D.

In addition to warning the user of his or her potential mistake, prediction module 164 may determine a corrective action that the user can take to increase the degree of likelihood of whether the user will be able to take the future action and include indication of the corrective action in the information indicating the current action being taken by the user will lead to the user not being able to take the future action. In other words, rather than just cause computing device 310 to output an acoustic alert for notifying the user of a mistake in continuing to travel along path 304D, prediction module 164 may send information for alerting the user of computing device 310 that by changing direction and taking path 304C, the user may still be able to arrive at location 303 by the future time.

Figure 4:
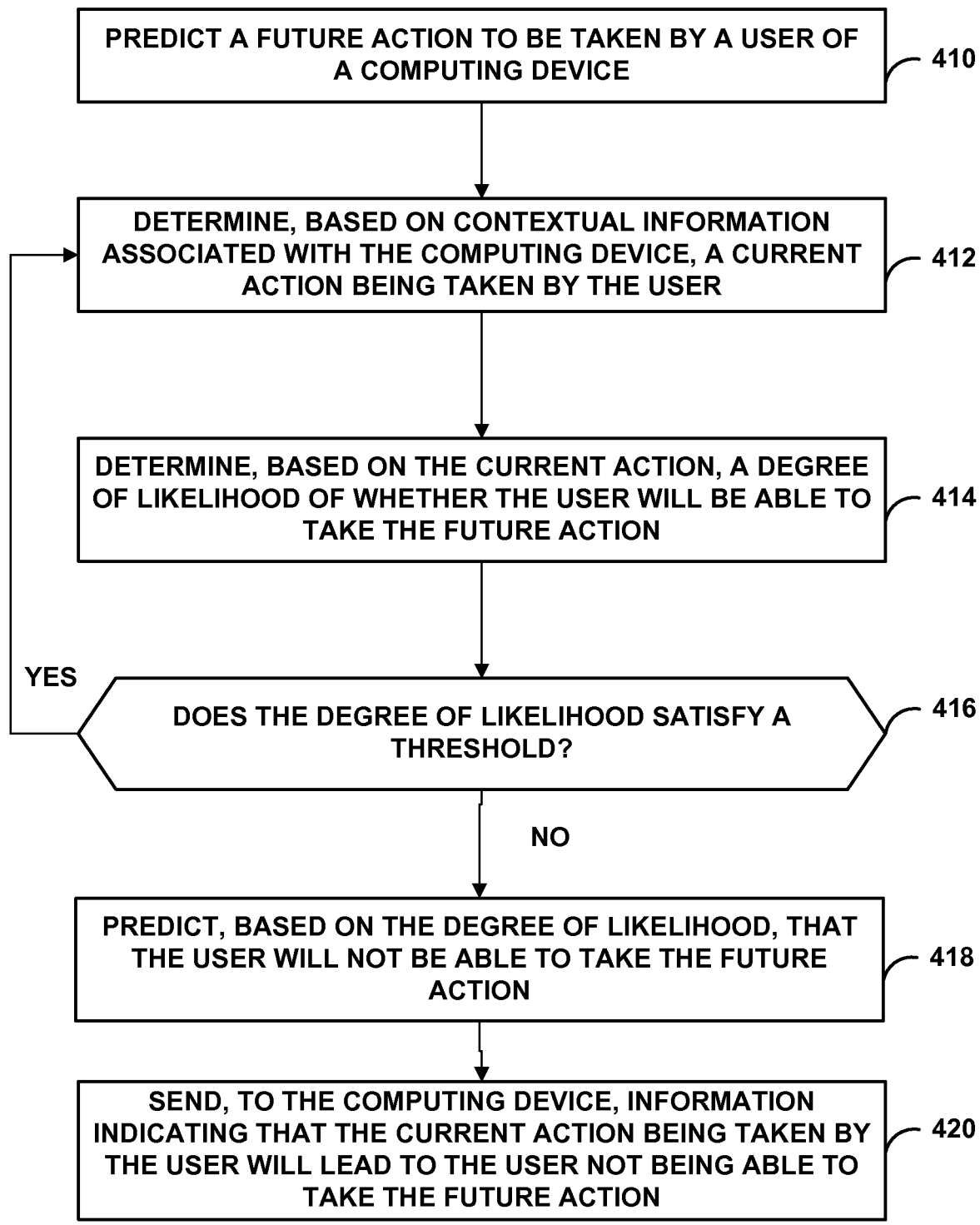
FIG. 4 is a flowchart illustrating example operations performed by an example computing system configured to predict whether a user of a computing device will be able to take a future action, in accordance with one or more aspects of the present disclosure.

FIG. 4 is a flowchart illustrating example operations 410-420 performed by an example computing system configured to predict whether a user of a computing device will be able to take a future action, in accordance with one or more aspects of the present disclosure. FIG. 4 is described below in the context of system 100 of FIG. 1. For example, ISS 160 may perform operations 410-420 whether a user of computing device 110 will be able to take a future action, and provide information to computing device 110 for alerting the user as to whether the user is predicted to be able to take the future action, in accordance with one or more aspects of the present disclosure.

As shown in FIG. 4, in operation, ISS 160 may predict a future action to be taken by a user of computing device 110 (410). For example, context module 162 of ISS 160 may receive contextual information associated with computing device 110 indicating that the user of computing device 110 typically watches a scheduled program and generate a future context that defines the user of computing device 110 watching a future broadcast of the scheduled program. Prediction module 162 may receive an indication of the future context and predict that the user will be watching the scheduled program at the future time.

ISS 160 may determine, based on contextual information associated with computing device 110, a current action being taken by the user (412). For example, context module 162 may receive data via network 130 indicating that the user of computing device 110 is using computing device 110 to navigate via a web browser or some other form of graphical user interface to rent a pay-per-view (PPV) broadcast of a sporting event scheduled for the same future time as the scheduled program and generate a current context associated with computing device 110 that defines the user as viewing the graphical user interface. Prediction module 164 may receive an indication of the current context from context module 162 and predict that the user is purchasing or renting the PPV broadcast at for future time.

ISS 160 may determine, based on the current action, a degree of likelihood of whether the user will be able to take the future action (414). For example, prediction module 164 may input the future action of watching the scheduled program and the current action of purchasing the PPV broadcast into one or more rules of a machine learning system and receive, as output, an indication of a degree of likelihood as to whether by purchasing the PPV program the user is more or less likely going to be able to view the scheduled program he or she normally watches. The degree of likelihood may be low (e.g., 10%) as the PPV program may run over the start time, or begin before the end time, of the scheduled program).

ISS 160 may determine whether the degree of likelihood satisfies a threshold (416). Prediction module 162 may determine that the degree of likelihood is not sufficiently high (e.g., greater than 90%) to indicate that the user will be able to perform the future action if he or she continues to perform the current action.

ISS 160 may predict, based on the degree of likelihood, that the user will not be able to take the future action (418). Responsive to determining that the degree of likelihood is not sufficiently high (e.g., greater than 90%), prediction module 162 may determine that the user will be unable to watch the scheduled program.

ISS 160 may send, to computing device 110, information indicating that the current action being taken by the user will lead to the user not being able to take the future action (420). For example, before the user completes the purchase of the PPV program, computing device 110 may receive information from prediction module 162 indicating that the purchase of the PPV program could interfere with the ability to watch the scheduled program and output an alert indicating as much to UID 112.

Numerous other examples of ISS 160 predicting whether a current action of a user of computing device 110 is compatible with a future action of the user exist. For example, ISS 160 may determine that the user is interacting with computing device 110 to purchase tickets for one event that will overlap and prevent attendance of another event for which the user has already purchased tickets and cause computing device 110 to warn the user of the potential mistake. ISS 160 may be aware of more than just start and stop times of events for determining potential conflicts. For example, the rules of prediction module 164 may learn from prior observations of other users of other computing devices that even though the start time of an event is at a particular time, reserved seating for the event opens up fifteen minutes before the actual start time, and if attendees are not at the event fifteen minutes early, the reserved seats open up to other event goers. So that even if the official start and end times of two events do not overlap, ISS 160 may warn a user of computing device 110 of a potential conflict in booking tickets for the two events if the end time of the earlier event overlaps with the "unofficial" start time (e.g., the reserved seating time) of the event.

Figure 5:
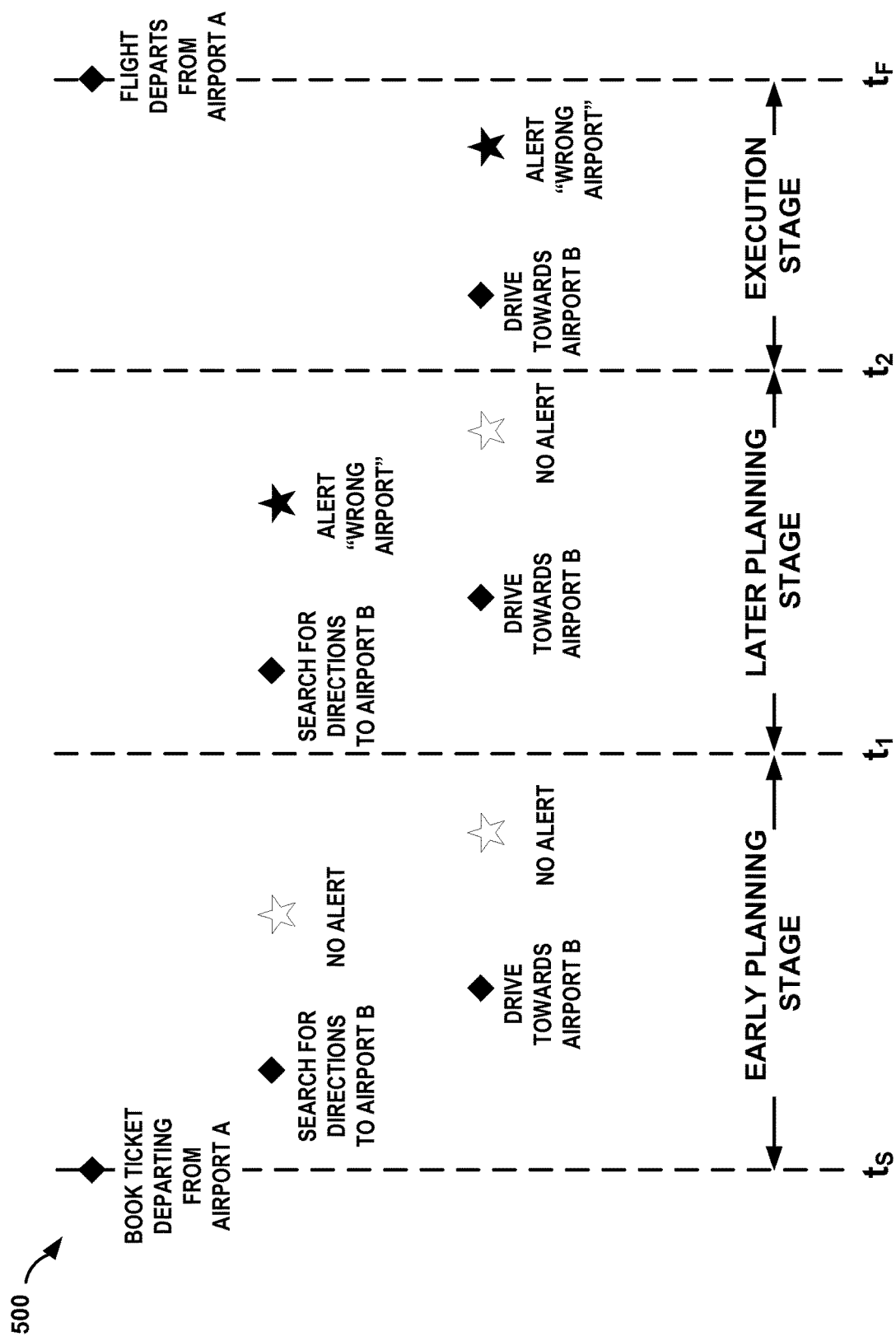
FIG. 5 is a conceptual diagrams illustrating an example timeline for an example computing system to predict whether a user of a computing device will be able to take a future action, in accordance with one or more aspects of the present disclosure

FIG. 5 is a conceptual diagrams illustrating an example timeline 500 for an example computing system, such as ISS 160 of FIG. 1 or ISS 260 of FIG. 2, to predict whether a user of a computing device, such as computing device 110 of FIG. 1, will be able to take a future action, in accordance with one or more aspects of the present disclosure. FIG. 5 is described below in the context of FIGS. 1-4.

The example timeline of FIG. 5 follows the following scenario that occurs between times $t_S$ and $t_F$. The user of computing device 110 may be flying from the city of London to the city of New York. Like many metropolitan areas, the city of London has more than one international airport. Although the user typically flies out of airport B, in the example of FIG. 5, the user, at time $t_S$ receives an e-mail confirmation about a flight he or she has booked that departs from airport A.

Timeline 500 is divided into an early planning stage between times $t_S$ and $t_1$, a later planning stage between times $t_1$ and $t_2$, and an execution stage between times $t_2$ and $t_F$. During early and later planning stages, ISS 160 may look at contextual information that does not necessarily include movement information against future actions, to predict when a user may be doing something that could inhibit the performance of that future action.

For example, as shown in timeline 500, at time $t_F$, context module 162 may record in a future contextual history associated with the user of computing device 110 the scheduled departure of the flight from airport A. During the early planning stage of timeline 500, the user of computing device 110 may input a search query for navigational directions to airport B and later, may begin moving towards airport B. Because the early planning stage is not close enough in-time to the execution stage, ISS 160 may determine a low degree of likelihood that the user, by searching for airport B or driving towards airport B, could be making a mistake that could prevent the user from catching the plane at airport A. ISS 160 may refrain from outputting an alert indicating any potential conflict between the user's current action and an expected action.

During the later planning stage of timeline 500, the user of computing device 110 may input a search query for navigational directions to airport B and later, may begin moving towards airport B. Because the later planning stage is closer in-time to the execution stage, ISS 160 may treat some actions as being likely to interfere with the future action of flying from airport A. For example, ISS 160 may receive contextual information indicating the user is searching for navigational directions for airport B, and this time, in response to the search query conflicting with an expected route or destination of airport A, ISS 160 may determine a high degree of likelihood that the user, by searching for airport B, could be making a mistake that could prevent the user from catching the plane at airport A. ISS 160 may output an alert indicating the potential conflict between the user's current actions of searching for directions to airport B when his or her expected location in the not too distant future is airport A.

ISS 160 may receive contextual information indicating the user is traveling towards airport B, and this time, even though the imminent destination of airport B conflicts with an expected route or destination of airport A, the user has sufficient time to travel to airport B and still travel to airport A, therefore ISS 160 may determine a low degree of likelihood that the user, by traveling to airport B, could be making a mistake that could prevent the user from catching the plane at airport A. ISS 160 may refrain from outputting an alert indicating the potential conflict between the user's current actions of traveling to airport B when his or her expected location is airport A.

During the execution stage, ISS 160 may rely more on (or give greater weight to) movement of computing device 110 to infer whether the user may or may not be making a mistake that could prevent the user from taking an expected action, than other types of contextual information. ISS 160 may determine, based on contextual information associated with computing device 110, that computing device 110 is moving along a trajectory towards airport B. ISS 160 may compare the current trajectory of computing device 110 to the locations of at airport A, airport B, and other potential locations that other users typically mistake for airports A and B. Responsive to determining that the path of computing device 110 is closest to or will more likely intersect with airport B (e.g., airport B being the same type of location as the future location associated with the future action), ISS 160 may predict that the user of computing device 110 is driving to airport B. Responsive to determining that the user of computing device 110 is driving to airport B, at the time when the user is expected to be driving towards airport A to catch the flight, ISS 160 may send data to computing device 110 triggering computing device 110 to sound an alarm or output some other haptic, visual, or audible alert indicting that the user is potentially driving to the wrong airport.

Although examples described use different "airports" as the example first and second locations that users could mistakenly search or navigate towards, other example locations exist. For example, the user may perform a current action of searching or navigating to a first location when the user is expected to arrive at a second location where the first location and the second location are different locations of a particular type of transportation service (e.g., bus depots, train stations, airports, marine depots, etc.). In other examples, the first location and the second location may be different respective offices of a single commercial establishment (e.g., two different locations of the same coffee or fast food chain, two different locations of a similar brand movie theatre, department store, etc.). In other examples, the first and the second location may be different respective cities of two different states or countries. In other examples, the first and the second location may be different respective physical locations that share the same street address of two different cities, states or countries.

In this way, unlike other computing devices and systems that simply provide reminders and access to information but may still allow a user to go in a direction or to take an action that could lead to a mistake being made in their everyday lives, the example system takes additional steps to ensure that mistakes are avoided and the future actions associated with the reminders and information are actually accomplished. Even if the user is unaware that he or she is making a mistake, the example system will still automatically provide information to guide the user back to avoid making the mistake.

For example, the example system may detect when a user is searching for something that will be incompatible with the person's everyday life and trigger an alert at a computing device that warns the user to the potential incompatibility. Other examples include detecting when the user is traveling to the wrong location of an appointment (i.e., going to wrong place), searching for or buying medicine that would be incompatible with current medicine that the user is or will be taking, searching for a winery when the system has inferred that the user should not be drinking, shopping for wrong the wrong part or adapter for a prior purchase, booking travel plans that have inconsistent dates or locations, etc.

Consequently, the user need not even be aware he or she is making a mistake, the computing system can infer whether the user may need to take corrective action to a current action without user input. The user may experience less stress and spend less time going down the wrong path towards a future action and less time correcting course to avoid making a mistake. By correcting potential mistakes earlier rather than later, the example system may enable the computing device to receive fewer inputs from a user searching for information to try and correct or rectify a mistake. With fewer inputs to correct potential failures, the example system may enable computing devices to conserve energy and use less battery power as compared to other systems that merely provide a user with capability to receive reminders or search for information.

Clause 1. A method comprising: predicting, by a computing system, a future action to be taken by a user of a computing device; determining, by the computing system, based on contextual information associated with the computing device, a current action being taken by the user; determining, by the computing system, based on the current action, a degree of likelihood of whether the user will be able to take the future action; and predicting, by the computing system, based on the degree of likelihood, that the user will not be able to take the future action; and sending, from the computing system, to the computing device, information indicating that the current action being taken by the user will lead to the user not being able to take the future action.

Clause 2. The method of clause 1, further comprising: determining, by the computing system, a corrective action that the user can take to increase the degree of likelihood of whether the user will be able to take the future action, wherein the information indicating the current action being taken by the user will lead to the user not being able to take the future action includes an indication of the corrective action.

Clause 3. The method of any of clauses 1-2 wherein: the future action includes arriving at a first location by a future time; the current action includes traveling from a current location to a second location that is different than the first location; and determining the degree of likelihood of whether the user will be able to take the future action comprises determining, by the computing system, based on the contextual information, an estimated arrival time for the user to arrive at the future location after traveling from the current location to the second location, and at least one of: increasing, by the computing system, the degree of likelihood in response to determining the estimated arrival time is within a threshold time of the future time; or decreasing, by the computing system, the degree of likelihood in response to determining the estimated arrival time is not within the threshold time of the future time.

Clause 4. The method of any of clauses 1-3 wherein: the future action includes arriving at a first location by a future time; the current action includes searching for information associated with a second location that is different than the first location; and determining the degree of likelihood of whether the user will be able to take the future action comprises decreasing, by the computing system, the degree of likelihood in response to determining the second location is a same type of location as the first location.

Clause 5. The method of clause 4, wherein the first location and the second location are different locations of a particular type of transportation service.

Clause 6. The method of any of clauses 4-5, wherein the first location and the second location are different respective offices of a single commercial establishment.

Clause 7. The method of any of clauses 1-6 wherein: the future action includes departing for a first location by a future time; the current action includes sleeping at a current time; and determining the degree of likelihood of whether the user will be able to take the future action comprises decreasing, by the computing system, the degree of likelihood in response to determining the current time is within a threshold time of the future time.

Clause 8. The method of any of clauses 1-7 wherein: the future action includes attending an event at a future time; the current action includes performing a preparatory action in preparation for attending the event at the future time; and determining the degree of likelihood of whether the user will be able to take the future action comprises decreasing, by the computing system, the degree of likelihood in response to determining the preparatory action cannot be completed within a threshold time of the future time.

Clause 9. A computing system comprising: at least one processor; and at least one module operable by the at least one processor to: predict a future action to be taken by a user of a computing device; determine, based on contextual information associated with the computing device, a current action being taken by the user; determine, based on the current action, a degree of likelihood of whether the user will be able to take the future action; and predict, based on the degree of likelihood, that the user will not be able to take the future action; and send, to the computing device, information indicating that the current action being taken by the user will lead to the user not being able to take the future action.

Clause 10. The computing system of clause 9 wherein the at least one module is further operable by the at least one processor to determine a corrective action that the user can take to increase the degree of likelihood of whether the user will be able to take the future action, wherein the information indicating the current action being taken by the user will lead to the user not being able to take the future action includes an indication of the corrective action.

Clause 11. The computing system of any of clauses 9-10 wherein: the future action includes arriving at a first location by a future time; the current action includes traveling from a current location to a second location that is different than the first location; and the at least one module is further operable by the at least one processor to determine the degree of likelihood of whether the user will be able to take the future action by at least determining, based on the contextual information, an estimated arrival time for the user to arrive at the future location after traveling from the current location to the second location, and at least one of: increasing the degree of likelihood in response to determining the estimated arrival time is within a threshold time of the future time; or decreasing the degree of likelihood in response to determining the estimated arrival time is not within the threshold time of the future time.

Clause 12. The computing system of any of clauses 9-11 wherein: the future action includes arriving at a first location by a future time; the current action includes searching for information associated with a second location that is different than the first location; and the at least one module is further operable by the at least one processor to determine the degree of likelihood of whether the user will be able to take the future action by at least decreasing the degree of likelihood in response to determining the second location is a same type of location as the first location.

Clause 13. The computing system of any of clauses 9-12 wherein: the future action includes departing for a first location by a future time; the current action includes sleeping at a current time; and the at least one module is further operable by the at least one processor to determine the degree of likelihood of whether the user will be able to take the future action by at least decreasing the degree of likelihood in response to determining the current time is within a threshold time of the future time.

Clause 14. The computing system of any of clauses 9-13 wherein: the future action includes attending an event at a future time; and the current action includes performing a preparatory action in preparation for attending the event at the future time; and the at least one module is further operable by the at least one processor to determine the degree of likelihood of whether the user will be able to take the future action by at least decreasing the degree of likelihood in response to determining the preparatory action cannot be completed within a threshold time of the future time.

Clause 15. A computer-readable storage medium comprising instructions that, when executed, cause at least one processor of a computing system to: predict a future action to be taken by a user of a computing device; determine, based on contextual information associated with the computing device, a current action being taken by the user; determine, based on the current action, a degree of likelihood of whether the user will be able to take the future action; and predict, based on the degree of likelihood, that the user will not be able to take the future action; and send, to the computing device, information indicating that the current action being taken by the user will lead to the user not being able to take the future action.

Clause 16. The computer-readable storage medium of clause 15 wherein the instructions, when executed, cause the at least one processor of the computing system to determine a corrective action that the user can take to increase the degree of likelihood of whether the user will be able to take the future action, wherein the information indicating the current action being taken by the user will lead to the user not being able to take the future action includes an indication of the corrective action.

Clause 17. The computer-readable storage medium of any of clauses 15-16 wherein: the future action includes arriving at a first location by a future time; the current action includes traveling from a current location to a second location that is different than the first location; and the instructions, when executed, cause the at least one processor of the computing system to determine the degree of likelihood of whether the user will be able to take the future action by at least determining, based on the contextual information, an estimated arrival time for the user to arrive at the future location after traveling from the current location to the second location, and at least one of: increasing the degree of likelihood in response to determining the estimated arrival time is within a threshold time of the future time; or decreasing the degree of likelihood in response to determining the estimated arrival time is not within the threshold time of the future time.

Clause 18. The computer-readable storage medium of any of clauses 15-17 wherein: the future action includes arriving at a first location by a future time; the current action includes searching for information associated with a second location that is different than the first location; and the instructions, when executed, cause the at least one processor of the computing system to determine the degree of likelihood of whether the user will be able to take the future action by at least decreasing the degree of likelihood in response to determining the second location is a same type of location as the first location.

Clause 19. The computer-readable storage medium of any of clauses 15-18 wherein: the future action includes departing for a first location by a future time; the current action includes sleeping at a current time; and the instructions, when executed, cause the at least one processor of the computing system to determine the degree of likelihood of whether the user will be able to take the future action by at least decreasing the degree of likelihood in response to determining the current time is within a threshold time of the future time.

Clause 20. The computer-readable storage medium of any of clauses 15-19 wherein: the future action includes attending an event at a future time; and the current action includes performing a preparatory action in preparation for attending the event at the future time; and the instructions, when executed, cause the at least one processor of the computing system to determine the degree of likelihood of whether the user will be able to take the future action by at least decreasing the degree of likelihood in response to determining the preparatory action cannot be completed within a threshold time of the future time.

Clause 21. The computing system of clause 9, comprising means for performing any of the methods of clauses 1-8.

Clause 22. The computer-readable storage medium of clause 15, comprising further instructions that, when executed cause the at least one processor of the computing system of clause 9 to perform any of the methods of clauses 1-8.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
predicting, by a computing system, a future action to be taken by a user of a computing device, wherein the future action includes arriving at a first location by a future time;
determining, by the computing system, based on contextual information associated with the computing device, a current action being taken by the user, wherein the current action includes searching, using the computing device, for navigational directions to a second location that is different than the first location;
determining, by the computing system, that the first location and the second location are different locations of a transportation service;
determining, by the computing system, based on the current action, a degree of likelihood of whether the user will be able to take the future action, wherein determining the degree of likelihood of whether the user will be able to take the future action comprises:
applying, as input across a machine learning model to generate an output, the contextual information associated with the computing device,
determining the degree of likelihood of whether the user will be able to take the future action based on the output, and
decreasing, by the computing system, the degree of likelihood in response to both:
determining the first location and the second location are different locations of the transportation service, and
determining a current time of the current action is within a threshold amount of time of the future time;
predicting, by the computing system, based on the degree of likelihood, that the user will not be able to take the future action; and
sending, from the computing system, to the computing device, information that proactively notifies the user that the current action being taken by the user will lead to the user not being able to take the future action and that proactively notifies the user of one or more corrective actions,
wherein sending the information occurs automatically in response to the searching for navigational directions to the second location, and
wherein sending the information causes the computing device to automatically present the information to the user in response to the searching for navigational directions to the second location.

2. The method of claim 1, further comprising:
determining, by the computing system, a corrective action that the user can take to increase the degree of likelihood of whether the user will be able to take the future action, wherein the information that proactively notifies the user that the current action being taken by the user will lead to the user not being able to take the future action includes an indication of the corrective action.

3. A computing system comprising:
at least one processor; and
at least one module operable by the at least one processor to:
  predict a future action to be taken by a user of a computing device,
wherein the future action includes arriving at a first location by a future time;
  determine, based on contextual information generated by the computing device, a current action being taken by the user, wherein the current action includes travelling to a second location that is different than the first location;
  determine that the first location and the second location are different locations of a transportation service;
  determine, based on the current action, a degree of likelihood of whether the user will be able to take the future action, wherein in determining the degree of likelihood of whether the user will be able to take the future action the at least one module is further operable by the at least one processor to:
    apply, as input across a machine learning model to generate an output, the contextual information associated with the computing device,
    determine the degree of likelihood of whether the user will be able to take the future action based on the output, and
    decrease the degree of likelihood in response to both:
      determining the first location and the second location are different locations of the transportation service, and
      determining a current time of the current action is within a threshold amount of time of the future time;
  predict, based on the degree of likelihood, that the user will not be able to take the future action; and
  send, to the computing device, information that proactively notifies the user that the current action being taken by the user will lead to the user not being able to take the future action and that proactively notifies the user of one or more corrective actions,
    wherein sending the information occurs automatically in response to predicting that the user will not be able to take the future action, and occurs while the user is travelling to the second location that is different than the first location, and
    wherein sending the information causes the computing device to present the information to the user.

4. The computing system of claim 3, wherein the at least one module is further operable by the at least one processor to determine a corrective action that the user can take to increase the degree of likelihood of whether the user will be able to take the future action, wherein the information that proactively notifies the user that the current action being taken by the user will lead to the user not being able to take the future action includes an indication of the corrective action.

5. A non-transitory computer-readable storage medium comprising instructions that, when executed, cause at least one processor of a computing system to:
  predict a future action to be taken by a user of a computing device, wherein the future action includes arriving at a first location by a future time;
  determine, based on contextual information generated by the computing device, a current action being taken by the user, wherein the current action includes travelling to a second location that is different than the first location;
  determine that the first location and the second location are different respective offices of a single commercial establishment;
  determine, based on the current action, a degree of likelihood of whether the user will be able to take the future action, wherein in determining the degree of likelihood of whether the user will be able to take the future action, the computing system is further operable by the at least one processor to:
    apply, as input across a machine learning model to generate an output, the contextual information associated with the computing device,
    determine the degree of likelihood of whether the user will be able to take the future action based on the output, and
    decrease the degree of likelihood in response to both:
      determining that the first location and the second location are different respective offices of the single commercial establishment, and
      determining a current time of the current action is within a threshold amount of time of the future time;
  predict, based on the degree of likelihood, that the user will not be able to take the future action; and
  send, to the computing device, information indicating that the current action being taken by the user will lead to the user not being able to take the future action and that proactively notifies the user of one or more corrective actions,
    wherein sending the information occurs automatically in response to predicting that the user will not be able to take the future action, and occurs while the user is travelling to the second location that is different than the first location, and
    wherein sending the information causes the computing device to present the information to the user.

6. The non-transitory computer-readable storage medium of claim 5, wherein the instructions, when executed, cause the at least one processor of the computing system to determine a corrective action that the user can take to increase the degree of likelihood of whether the user will be able to take the future action, wherein the information that proactively notifies the user that the current action being taken by the user will lead to the user not being able to take the future action includes an indication of the corrective action.

7. The method of claim 1, wherein determining the degree of likelihood is further based on a current location of the computing device.

8. The method of claim 1, further comprising:
prior to determining the degree of likelihood based on the output:
  obtaining, from one or more databases, previous contextual information associated with the computing device, identifying, from one or more of the databases, previous actions associated with the previous contextual information, and training the machine learning model based on the previous actions and the associated previous contextual information.

\* \* \* \* \*